(12) United States Patent
Moore et al.

(10) Patent No.: US 8,964,906 B1
(45) Date of Patent: Feb. 24, 2015

(54) DIGITAL SIGNAL PROCESSING APPARATUS HAVING PARAMETER MEMORY DEVICE AND PROCESS OF USING SUCH

(71) Applicant: L-3 Communications Corp., New York, NY (US)

(72) Inventors: David J. Moore, Salt Lake City, UT (US); Teren G. Jameson, Salt Lake City, CA (US); Dan M. Griffin, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 273 days.

(21) Appl. No.: 13/646,313

(22) Filed: Oct. 5, 2012

(51) Int. Cl.
*H04L 27/06* (2006.01)

(52) U.S. Cl.
USPC ........................................... 375/340; 375/316

(58) Field of Classification Search
USPC .................................................. 375/340, 316
See application file for complete search history.

(56) References Cited

U.S. PATENT DOCUMENTS

| | | | | |
|---|---|---|---|---|
| 5,175,698 | A | * | 12/1992 | Barbanell ..................... 702/112 |
| 2001/0046225 | A1 | * | 11/2001 | Schwaller et al. ............. 370/343 |
| 2003/0067725 | A1 | * | 4/2003 | Horvath et al. ................. 361/65 |
| 2009/0047956 | A1 | * | 2/2009 | Moe et al. ..................... 455/436 |

\* cited by examiner

*Primary Examiner* — Michael Neff
(74) *Attorney, Agent, or Firm* — Kirton McConkie

(57) ABSTRACT

A digital signal processing (DSP) apparatus is used for processing a plurality of different signals. The DSP apparatus includes a DSP module configured to perform a DSP algorithm on samples of the signals. The DSP apparatus also has a parameter memory that includes a plurality of memory cells. The parameter memory has a signal number input and a parameter output. The parameter output is connected to the DSP module. The parameter memory is configured to output to the parameter output a parameter corresponding to a signal identifier at the signal number input.

20 Claims, 5 Drawing Sheets

DIGITAL SIGNAL PROCESSING APPARATUS HAVING PARAMETER MEMORY DEVICE AND PROCESS OF USING SUCH

BACKGROUND

Digital signal processing (DSP) can be used to manipulate digital data signals to modify or improve those signals. Some DSP processing operations utilize one or more parameters that correspond to a signal being processed during the processing of that signal. While such DSP circuits can effectively process a single signal, challenges arise when multiple signals need to be processed and some or all of the signals have different parameters or parameter sets. One solution to these challenges has been to duplicate the DSP circuit for each signal and customize the parameter elements of each DSP circuit for each signal. However, this solution is hardware intensive because it requires a single instantiation of the DSP circuit for each signal. Accordingly, the present invention provides a DSP apparatus that is capable of processing multiple signals in a single instantiation of a DSP apparatus using one or more parameter memories that are configured to store a single parameter or parameter set for each signal processed in the DSP apparatus.

SUMMARY

In some embodiments of the invention, a digital signal processing (DSP) apparatus for processing a plurality of different signals can include a DSP module and a parameter memory. The DSP module can be configured to perform a DSP algorithm on the signals. The parameter memory can include memory cells each with sufficient storage to store a parameter corresponding to at least one of the signals. The parameter memory can also include a signal number input and a parameter output, which can be connected to the DSP module. The parameter memory can be configured to output to the parameter output a parameter corresponding to a signal identifier at the signal number input.

In some embodiments, a process of performing a DSP algorithm on a serial stream of samples of "n" number of different signals can include providing a serial stream of samples of "n" number of different signals to a DSP module. The process can also include providing to a signal number input of a parameter memory a serial stream of signal identifiers. Each of the signal identifiers can identify one of the signals to which one of the samples corresponds. The process can further include outputting to a signal output of the parameter memory a serial stream of parameters stored in one or more memory cells of the parameter memory identified by the serial stream of signal identifiers at the sample number input, and the process can include providing the serial stream of parameters to the DSP module.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, the singular forms "a," "an," and "the" include plural referents unless the context clearly dictates otherwise. Thus, for example, reference to a terminal includes reference to one or more terminals. In addition, where reference is made to a list of elements (e.g., elements a, b, c), such reference is intended to include any one of the listed elements by itself, any combination of less than all of the listed elements, and/or a combination of all of the listed elements.

Numerical data may be expressed or presented herein in a range format. It is to be understood that such a range format is used merely for convenience and brevity and thus should be interpreted flexibly to include not only the numerical values explicitly recited as the limits of the range, but also as including all the individual numerical values or sub-ranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

By the term "substantially" is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. As a particular example, in a digital electronics systems, two clock or other signal edges can be substantially time coincident when they are generated or triggered by a common event. The clock edges may not, however, be precisely aligned.

As used herein, the term "signal" refers to an electronic signal within a communications system. A signal can be a radio frequency signal propagating in free space or substantially confined within a signal path (e.g., a coaxial cable, waveguide, printed circuit board trace, internal wiring within an integrated circuit etc.). A signal can also be a digital signal or analog signal on a signal path. Digital signals can also be stored within digital circuits, for example in the form of particular bit patterns within a register, latch, memory, or the like. Signals can be converted between formats (e.g., between digital and analog, between stored and propagating, etc.) using various techniques (e.g., digital to analog converters, analog to digital converters, input buffers, output buffers, direct memory access controllers, etc.).

As used herein, the term "parameter" refers to one or more values used in a DSP process. Examples of parameters include variables or coefficients associated with a signal in a DSP computation process.

As used herein, the term "digital signal sample" refers to a digital value or set of values taken from a signal at a point in time or space. A series of such digital signal samples represents a digitized form of the signal. For example, an analog signal can be sampled by an analog-to-digital converter (ADC) at specific intervals, and the resulting series of digital signal samples represents the signal digitally.

Figure 1:
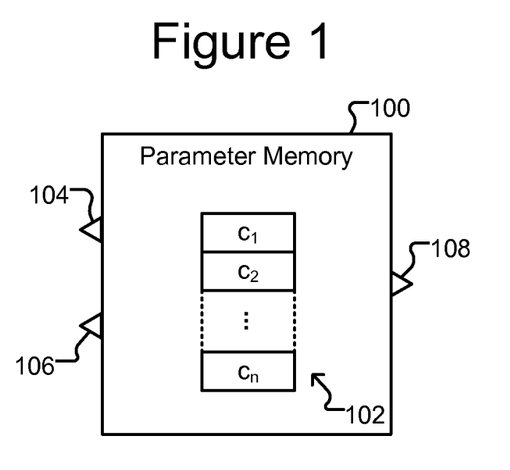
FIG. 1 is a block diagram of an example of a parameter memory in accordance with some embodiments of the present invention.

FIG. 1 illustrates an example of a parameter memory 100 in accordance with some embodiments of the present invention. The parameter memory 100 can be used in a DSP apparatus (e.g., the DSP apparatus 200 of FIG. 2, the DSP apparatus 300 of FIG. 3, or the DSP apparatus 600 of FIG. 6) to provide a parameter to a DSP module. As shown, the parameter memory 100 can include multiple memory cells $C_1, C_2 \ldots C_n$ 102. Each memory cell 102 can be capable of storing a single parameter or parameter set for each signal processed in a DSP apparatus.

As shown, the parameter memory 100 can include a signal number input 104 and a parameter output 108. The parameter memory 100 can be configured to output at the parameter output 108 a parameter corresponding to a signal identifier at the signal number input 104. For example, a signal identifier at the signal number input 104 can identify a particular signal of the plurality of signals supported by the parameter memory 100. The parameter memory 100 can then access a parameter or set of parameters stored in a memory cell 102 of the parameter memory 100 corresponding to that signal. The parameter memory 100 can then output that parameter or parameter set to the parameter output 108.

In some embodiments, the parameter memory 100 can have an enable input 106. The enable input 106 can receive an enable signal that validates the incoming parameter number request and permits the read operation. In some embodiments, the enable signal can be a strobe signal.

As shown in FIG. 1, the parameter memory 100 can include a plurality of memory cells $C_1, C_2 \ldots C_n$ 102. The number of memory cells 102 can be equal to or less than the number of incoming signals for which the parameter memory 100 stores parameters since only a single parameter may be needed for each signal. In other embodiments, the number of memory cells 102 can be greater than the number of signals so that multiple parameters can be stored for each signal. Using more memory cells 102 than signals can also provide capability to expand the number of signals supported by the parameter memory 100.

In some embodiments, each memory cell 102 can correspond to a single signal of an "n" number of incoming signals. As such, the parameter memory can include an "n" number of memory cells 102. Each of the "n" number of memory cells 102 can be dedicated to storing one or more parameters for an incoming signal. In other embodiments, the memory cells 102 can correspond to one or more signals of an "n" number of incoming signals. A description of such embodiments is provided below with reference to FIG. 5.

Prior to use of the parameter memory 100 in DSP processes, the parameter memory can be programmed. During programming, the parameters corresponding to each input signal can be stored in the parameter memory 100. Accordingly, in some embodiments, the parameter memory 100 can include a parameter input (not shown) and/or a write enable input (not shown). As such, a parameter can be provided to the parameter input and a write enable signal provided to the write enable input. Moreover, a signal identifier can be provided to the signal number input 104 or an alternative input. The parameter memory 100 can be configured to store the parameter at the parameter input in a memory cell 102 corresponding to the signal identifier. This process can be repeated for each signal for which a parameter is stored in the parameter memory 100.

In some embodiments, the parameter memory 100 comprises a random access memory (RAM) device. As such, parameters stored in the parameter memory 100 can be accessed in any order. Moreover, the parameter memory 100 can be embodied in an integrated circuit, in a software or firmware implementation, or embodied in another suitable form.

Figure 2:
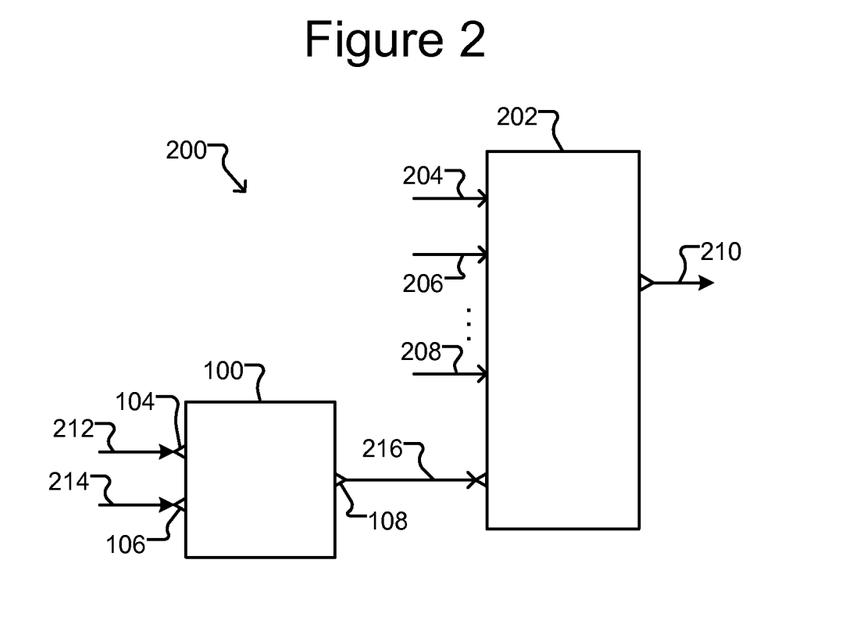
FIG. 2 is a block diagram of an example of a DSP apparatus comprising a parameter memory and a DSP module in accordance with some embodiments of the present invention.

FIG. 2 illustrates an example of a DSP apparatus 200 capable of processing a plurality of different signals (e.g., signal $S_A$ 204, signal $S_B$ 206, and signal $S_C$ 208). The DSP apparatus 200 can include the parameter memory 100 of FIG. 1. The DSP module 202 can be configured to perform a DSP algorithm on digital signal samples from the plurality of different signals. As such, in some configurations, a stream of parameters 216 output from the parameter memory 100 can be an input directly or indirectly into a digital arithmetic module of the DSP module 202, such as an adder, multiplier, etc. These inputs can be coordinated with the processing of the signal samples so that a parameter corresponding to a particular signal is input at the same time as one or more samples of that signal is being processed.

As shown, a parameter memory 100 can be connected to the DSP module 202. The parameter memory 100 can be configured to output from the parameter output 108 a parameter corresponding to a signal identifier at the signal number input 104. Moreover, when a serial stream of signal identifiers 212 is input at signal number input 104, the parameter memory 100 can be configured to output a serial stream of parameters 216. The serial stream of parameters 216 can be used by the DSP module 202 processing a serial stream of samples from the plurality of different signals (e.g., signal $S_A$ 204, signal $S_B$ 206, and signal $S_C$ 208). The DSP module 202 can utilize the serial stream of parameters 216 in one or more DSP algorithms to process the plurality of incoming signals to produce an output 210. As mentioned, the arrival of the serial stream of parameters 216 corresponding to a signal can be coordinated to arrive at approximately the same time as a sample of that signal is being processed. As further shown, in some embodiments, an enable signal 214 can be fed to the enable input 106.

Figure 3:
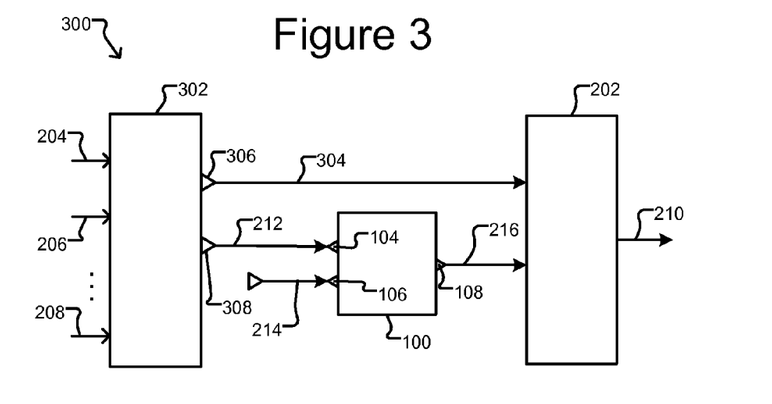
FIG. 3 is a block diagram of a DSP apparatus comprising a mixing module, a parameter memory, and a DSP module in accordance with some embodiments of the present invention.
Figure 4:
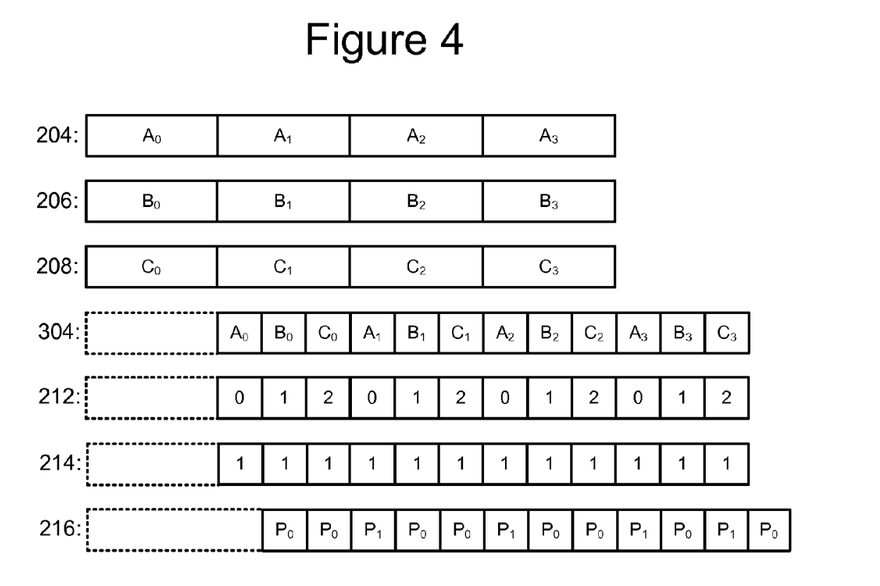
FIG. 4 is a timing diagram of some of the data inputs and outputs of the DSP apparatus of FIG. 3 in accordance with some embodiments of the present invention.

Reference will now be made to FIGS. 3 and 4. FIG. 3 illustrates another example of a DSP apparatus 300 that employs a parameter memory 100 according to some embodiments of the invention. FIG. 4 illustrates a timing diagram of some of the data inputs and outputs of the DSP apparatus 300 of FIG. 3.

Referring first generally to FIG. 3, the DSP apparatus 300 has a mixing module 302, a parameter memory 100, and a DSP module 202. The parameter memory 100 can be as in FIG. 1. Moreover, the DSP modules 202 can be similar to that of FIG. 2, but instead of receiving a plurality of signals in parallel, it receives a serial stream of digital signal samples 304 from the mixing module 302.

The mixing module 302 can include a plurality of inputs (not shown) each configured to receive a separate signal (e.g., signal $S_A$ 204, signal $S_B$ 206, and signal $S_C$ 208). The mixing module 302 can further include a sample output 306 and a signal number output 308. The sample output 306 can output a serial stream of digital signal samples 304 that comprises digital signal samples from each of the signal $S_A$ 204, signal $S_B$ 206, and signal $S_C$ 208. The signal identifier output 308 can output a serial stream of signal identifiers 212 each of which corresponds to one of the digital signal samples in the serial stream 304 and identifies the signal $S_A$ 204, signal $S_B$ 206, or signal $S_C$ 208 to which the digital signal sample corresponds. The signal identifier output 308 can be connected to the signal number input 104 of the parameter memory 100. After receiving the serial stream of identifiers 212, the parameter memory 100 can output a serial stream of parameters 216 that correspond to the serial stream of identifiers 212. This serial stream of parameters 216 can be input into the DSP module 202 along with the serial stream of digital signal samples 304. The DSP module 202 can process the serial stream of digital signal samples 304 using the serial stream of parameters 216 to produce a result at output 210.

Reference will now be made to an example of the operation of the DSP apparatus 300 of FIG. 3 using the timing diagrams of FIG. 4. As shown, the mixing module 302 can receive a plurality of "n" number of different signals as separate signals. FIG. 4 shows three different signals: signal $S_A$ 204, signal $S_B$ 206, and signal $S_C$ 208. Thus, in FIG. 4, "n" is equal to three. In other embodiments, more or fewer than three signals are received by the mixing module 302. For example, the number of incoming signals, "n," can be between 2-30 or more than 30. For instance, 2, 4, 5, 6, 7, 8, 9, 10, more than 10, more than 15, more than 20, or more than 30 signals can be input into the DSP apparatus 202.

As shown in FIG. 4, each signal $S_A$ 204, $S_B$ 206, and $S_C$ 208 can be in digital format and can thus comprise a sequence of digital signal samples. For example, signal $S_A$ 204 is shown as comprising digital signal samples $A_0$, $A_1$, $A_2$, and $A_3$. Similarly, signal $S_B$ 206 comprises digital signal samples $B_0$, $B_1$, $B_2$, and $B_3$, and signal $S_C$ 208 comprises digital signal samples $C_0$, $C_1$, $C_2$, and $C_3$. For simplicity of illustration only four digital signal samples (samples A-D, of each signal are shown) though it will be understood that each of these signals can comprise many more digital signal samples.

The mixing module 302 can receive signal $S_A$ 204, signal $S_B$ 206, and signal $S_C$ 208 and output a serial stream of digital signal samples 304 that, as discussed above, comprise digital signal samples from each of signal $S_A$ 204, signal $S_B$ 206, and signal $S_C$ 208. As shown in FIG. 3, this serial stream of digital signal samples 304 can then be input into DSP module 202. As shown in FIG. 4, the serial stream of digital signal samples 304 can be understood as including a serial stream of digital signal sample sets. As shown, each sample set can include a single digital signal sample from each of the "n" number of different signals. For example, a first sample set can include digital signal samples $A_0$, $B_0$, and $C_0$, which include a single digital signal sample from signals $S_A$ 204, $S_B$ 206, and $S_C$ 208. As shown, this first sample set is output from the mixing module 302 after a delay (delays are represented in FIG. 4 with broken lines) after these digital signal samples were received by the mixing module 302. Continuing with the illustrated example, a second sample set of the serial stream of digital signal samples 304 can include digital signal samples $A_1$, $B_1$, and $C_1$, a third sample set of the serial stream of digital signal samples 304 can include samples $A_2$, $B_2$, and $C_2$, and a fourth sample set of the serial stream of digital signal samples 304 can include samples $A_3$, $B_3$, and $C_3$. As shown, in some embodiments, the digital signal samples in each sample set can be consistently ordered. Examples of such order include arranging the digital signal samples in each sample set in the same order, such as a digital signal sample from signal $S_A$ 204 being first, a digital signal sample from signal $S_B$ 206 being second, a digital signal sample from signal $S_C$ 208 being last. In other embodiments, the digital signal samples in each sample set are not ordered. Moreover, in some embodiments, the digital signal samples in the serial stream of digital signal samples 304 are not arranged in intentional sample sets, but merely output in the order they are received.

Referring still to FIGS. 3 and 4, in addition to outputting the serial stream of digital signal samples 304, the mixing module 302 can simultaneously output a serial stream of signal identifiers 212. Each signal identifier of the serial stream of signal identifiers 212 can correspond to one of the digital signal samples in the serial stream of digital signal samples 304 and can identify the signal from which the digital signal sample was taken. For example, as shown in FIG. 4, each digital signal sample from signal $S_A$ 204 corresponds to (e.g., is output at the same time as) a signal identifier having a value of "0." Similarly, each digital signal sample from signal $S_B$ 206 can correspond to a signal identifier having a value of "1," and each digital signal sample from signal $S_C$ 208 can correspond to a signal identifier with the value of "2." In some embodiments, as shown, each signal identifier can correspond to the digital signal sample in the serial stream of digital signal samples 304 that is output from the mixing module 302 at the same time as that signal identifier. Thus, the time relationship of the output signal identifier and digital signal sample can establish the correlation between these outputs. Other correlations are also contemplated.

As mentioned, the signal identifiers of the serial stream of signal identifiers 212 at the signal number input 104 of the parameter memory 100 can correspond to a parameter stored in a memory cell 102 of the parameter memory 100 (see FIG. 1). As such, the signal identifier can identify the signal from which a digital signal sample was taken. The signal identifier of the serial stream of signal identifiers 212 can be used to identify the memory cell 102 of the parameter memory 100 from which a parameter is to be output. For example, as shown in FIG. 4, the first signal identifier of the serial stream of identifiers 212 has a value of "0," which corresponds to digital signal sample $A_0$. Signal identifier "0" can thus identify that a parameter corresponding to signal $S_A$ is to be output from the parameter memory 100. Accordingly, at the next clock cycle, parameter $P_0$ is output in the serial stream of parameters 216. For the sake of example, parameter $P_0$ corresponds to signal $S_A$. In addition, for the sake of example, the parameter memory 100 outputs a parameter at approximately one clock cycle after receiving the corresponding signal identifier at the signal number input 104.

Continuing the example, the next signal identifier has a value of "1" and corresponds to digital signal sample $B_0$. Signal identifier "1" can thus identify that a parameter corresponding to signal $S_B$ is to be output from the parameter memory 100. Accordingly, at the next clock cycle, parameter $P_0$ is output in the serial stream of parameters 216. For the sake of example, parameter $P_0$ corresponds to signal $S_B$. Similarly, the next signal identifier has a value of "2" and corresponds to sample $C_0$. Signal identifier "2" can thus identify that a parameter corresponding to signal $S_C$ is to be output from the parameter memory 100. Accordingly, at the next clock cycle, parameter $P_1$ is output in the serial stream of parameters 216. For the sake of example, parameter $P_1$ corresponds to signal $S_C$. Continuing this example, FIG. 4 further illustrates the serial stream of parameters 216 output from the parameter memory 100, with parameter $P_0$ corresponding to signals $S_A$ and $S_B$ and parameter $P_1$ corresponding to signal $S_C$.

As shown in FIG. 4, in some instances, two or more signals of the plurality of signals can have the same parameter or set of parameters. For example, signals $S_A$ and $S_B$ each share the same parameter, $P_0$. Accordingly, in some instances, hardware in the parameter memory 100 may be saved by storing only a single instance of each parameter and then storing a lookup table that coordinates each parameter to each signal. Thus, in these embodiments, the parameter memory 100 does not allocate a single memory cell for each signal.

Figure 5:
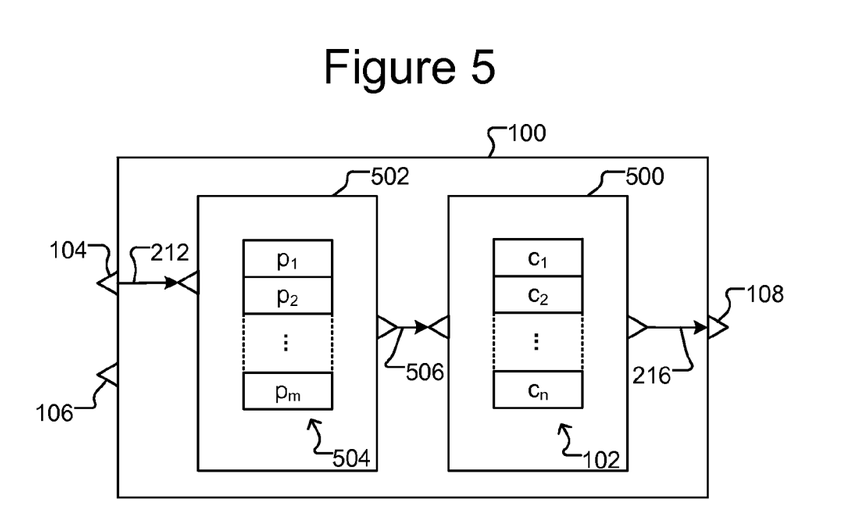
FIG. 5 is a block diagram of another example of a parameter memory in accordance with some embodiments of the present invention.

Reference will now be made to FIG. 5, which illustrates an example of a parameter memory 100 that includes a first set of memory cells 102 that can function to store a single instance of each parameter and a second set of memory cells 504 that can function as a parameter lookup table to correlate the address in the first set of memory cells 102 of a parameter corresponding to a signal number identified at the signal number input 104 Accordingly, as shown, the parameter memory 100 can include two sets of memory cells: a first set 102 and a second set 504. The first set of memory cells 102 can be similar to the memory cells 102 of FIG. 1. As such, each memory cells 102 of the first set can have sufficient storage to store a single parameter, or set of parameters. The second set of memory cells 504 can each have sufficient storage to store an address alternately, of a memory cell of the first plurality of memory cells 102.

In some embodiments, each set of memory cells is included in a separate memory device, such as a RAM device, as previously described. As such, the first set of memory cells 102 can be part of a first memory device 500, and the second set of memory cells 504 can be part of a second memory device 502.

In operation, the parameter memory 100 can be configured to look up and output an address (which can in some configurations, be part of a serial stream of addresses 506) of a memory cell of the first plurality of memory cells 102 from a memory cell of the second plurality of memory cells 504 corresponding to the signal identifier at the signal number input 104. Thus, the signal identifier can be used to look up (in the second set of memory cells 504) the address of the parameter in the first set of memory cells 102. The parameter memory 100 can be further configured to output (to the parameter output 110) a parameter (as part of a serial stream of parameters 216) in the memory cell of the first plurality of memory cells 102 corresponding to the address 506 output from the second plurality of memory cells 504.

In some embodiments, the parameter memory 100 shown in FIG. 5 can provide hardware savings over parameter memory configurations that include only a single plurality of memory cells, such as that shown in FIG. 1. For example, when a large number of incoming signals share a common parameter or set of parameters, multiple memory cells of the second plurality of memory cells 504 can include the same address for the first set of memory cells 102. As such, the first set of memory cells 102 can include fewer memory cells. Moreover, the hardware requirement for the second plurality of memory cells 504 can be less than that of the first plurality of memory cells 102. Thus, by decreasing the size of the first set of memory cells 102 by adding the smaller, second plurality of memory cells 504, the parameter memory 100 can utilize less hardware.

Figure 6:
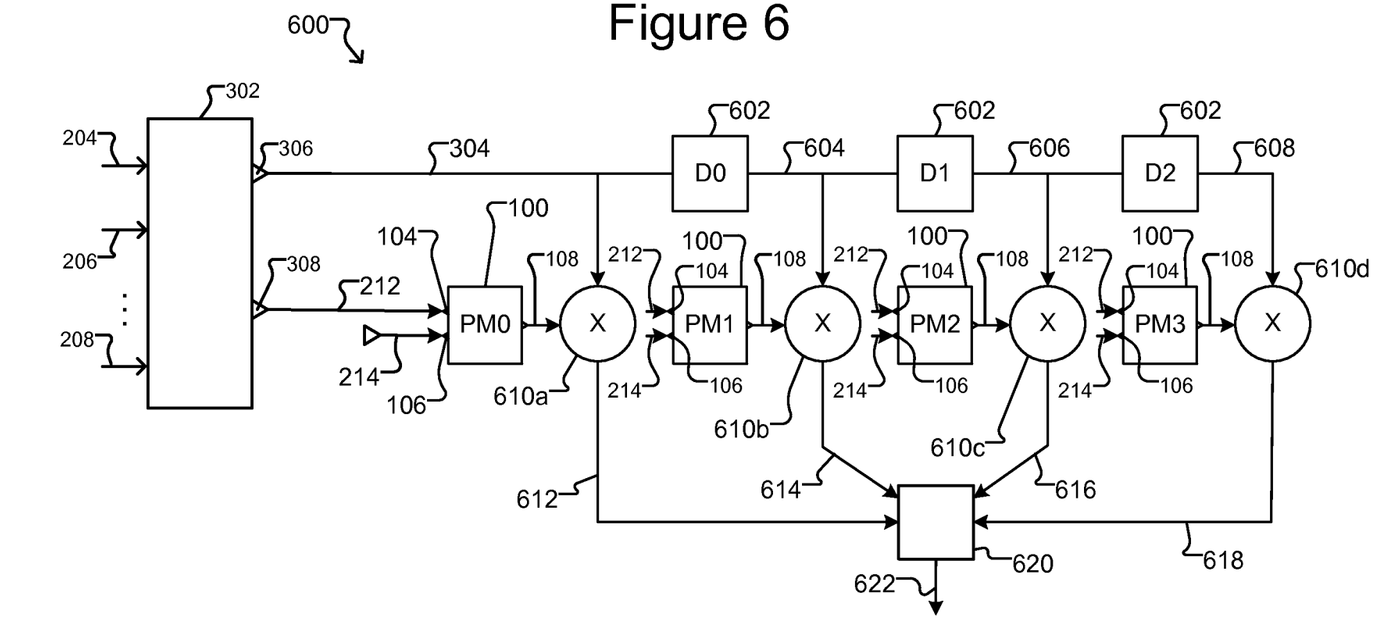
FIG. 6 is a block diagram of a DSP module connected to a plurality of parameter memories in accordance with some embodiments of the present invention.

FIG. 6 illustrates another example of a DSP apparatus 600 according to some embodiments of the invention. As shown, the DSP apparatus 600 includes the mixing module 302 that outputs a serial stream of digital signal samples 304 comprising digital signal samples from a plurality of signals $S_A$ 204, $S_B$ 206, and $S_C$ 208 and a serial stream of identifiers 212 each of which corresponds to one of the digital signal samples in the stream 304 and identifies the signal $S_A$ 204, $S_B$ 206, and $S_C$ 208 from which the digital signal sample corresponds as discussed above.

As also shown in FIG. 6, the DSP apparatus 600 can comprise a plurality of delay elements D0, D1, and D2 602, a plurality of multipliers 610a, 610b, 610c, and 610d, and a processing block 620. In some embodiments, the delay elements DM0, DM1, and DM2 602 can be delay memories such as are disclosed in the patent application entitled "A Digital Signal Processing Apparatus With A Delay Memory Having A Plurality Of Memory Cells And Process For Using Such" having Ser. No. 13/659,887 filed on the same date and naming the same inventors as the instant application. The number of such delay elements D0, D1, and D2 602, multipliers 610a, 610b, 610c, and 610d, and processing block 620 shown are an example only, and there can be different numbers of the foregoing entities. The DSP apparatus 600 also includes a plurality of parameter memories PM0 MP1, MP2, and PM3 100 each of which can be the parameter memory 100 of FIG. 1.

As shown in FIG. 6, each digital signal sample in the serial stream 304 is input into multiplier 610a, where the digital signal sample is multiplied by a parameter from parameter memory PM0 100. The digital signal sample is also delayed by delay element D0 and, after the delay, input 604 into multiplier 610b, where the digital signal sample is multiplied by a parameter from parameter memory PM1 100. The digital signal sample is then delayed by delay element D1 and, after the delay, input into multiplier 610c, where the digital signal sample is multiplied by a parameter from parameter memory PM2 100; and the digital signal sample is then delayed by delay element D2 and, after the delay, input into multiplier 610d, where the digital signal sample is multiplied by a parameter from parameter memory PM3 100. The outputs 612, 614, 616, and 618 of the multipliers 610a, 610b, 610c, and 610d are then further processed by processing block 620. Output 622 is the DSP output of the DSP apparatus 600.

For example, the processing block 620 can be an adder, and the DSP apparatus 600 can thus perform a finite impulse response (FIR) filtering function. Alternatively, the processing block 620 can be configured such that the DSP apparatus 600 performs other DSP algorithms such as infinite impulse response filtering, equalization, numerically controlled oscillation, or the like. Also the multipliers 610a, 610b, 610c, and 610d can alternatively perform other functions, such as other arithmetic functions.

Regardless, as a particular digital signal sample in the sample stream 304 is presented at the input of a multiplier 610a, 610b, 610c, or 610d (e.g., from 304, 604, 606, or 608 in FIG. 6), the identifier in the stream of identifiers 214 presented at the corresponding parameter memory PM0, PM1, PM2, or PM3 100 identifies the signal $S_A$ 204, $S_B$ 206, or $S_C$ 208 to which the particular digital signal sample corresponds, which causes the corresponding parameter memory PM0, PM1, PM2, or PM3 100 to output the pre-stored parameter that corresponds to the identified signal $S_A$ 204, $S_B$ 206, or $S_C$ 208. The multipliers 610a, 610b, 610c, and 610d each multiply the digital signal sample in sample stream 304 and the parameter from parameter memory PM0, PM1, PM2, or PM3 100.

Referring to the example illustrated in FIG. 4, when the digital signal sample $A_0$, for example, in the serial stream 304 is presented as the input to the multiplier 610a, the identifier "0" in the identifier stream 212 appears at the input 104 of the parameter memory PM0 100. The parameter memory PM0 100 outputs the pre-stored parameter that corresponds to signal $S_A$, which corresponds to the identifier "0." The multiplier 610a then multiplies the digital signal sample $A_0$ by the parameter output by the parameter memory PM0 100. As another example, when the digital signal sample $B_2$ in the serial stream 304 is presented as the input to the multiplier 610c the identifier "1" in the identifier stream 212 appears at the input 104 of the parameter memory PM2 100. The parameter memory PM2 100 outputs the pre-stored parameter that corresponds to signal $S_B$, which corresponds to the identifier "1." The multiplier 610c then multiplies the digital signal sample $B_2$ by the parameter output by the parameter memory PM2 100.

In some embodiments, the inputs 104 of each of the parameter memories PM0, PM1, PM2, and PM3 can be commonly connected to the output 308 of the mixing module 302 and thus fed by the identifier stream 212. The enable inputs 106 of each of the parameter memories PM0, PM1, PM2, and PM3 can similarly be commonly fed by the same enable signal 214. In some embodiments, one or more of the parameter memories PM0, PM1, PM2, and/or PM3 100 can be configured to be placed in a pass through mode in which the output of another of the parameter memories provides the parameter to be multiplied at a corresponding multiplier 610a, 610b, 610c, and/or 610d. Thus, where the same parameter is to be multiplied by, for example, all of the digital signal samples presented to the inputs of the multipliers 610a, 610b, 610c, and 610d, the parameter can be provided at the output of one of parameter memory PM0 and then passed through to all of the parameter memories PM1, PM2, and PM3.

Reference will now be made to a specific application of a DSP apparatus. In some embodiments, the DSP apparatus 200 of FIG. 2, the DSP apparatus 300 of FIG. 3, or the DSP apparatus 600 of FIG. 6 can be incorporated into a time-shared demodulator. Data communication receivers can use time-shared digital demodulators to simultaneously process multi-signal (or multi-user) communications. Such digital demodulators operate in accordance with a selected modulation scheme to recover the data being conveyed by using one or more digital signal processing (DSP) algorithms. Thus, one or more embodiments of the present DSP apparatus (e.g., DSP apparatus 200 of FIG. 2, DSP apparatus 300 of FIG. 3, or DSP apparatus 600 of FIG. 6) can be employed in a time-shared demodulator to simultaneously process multiple incoming signals using a single instantiation of a DSP circuit.

Figure 7:
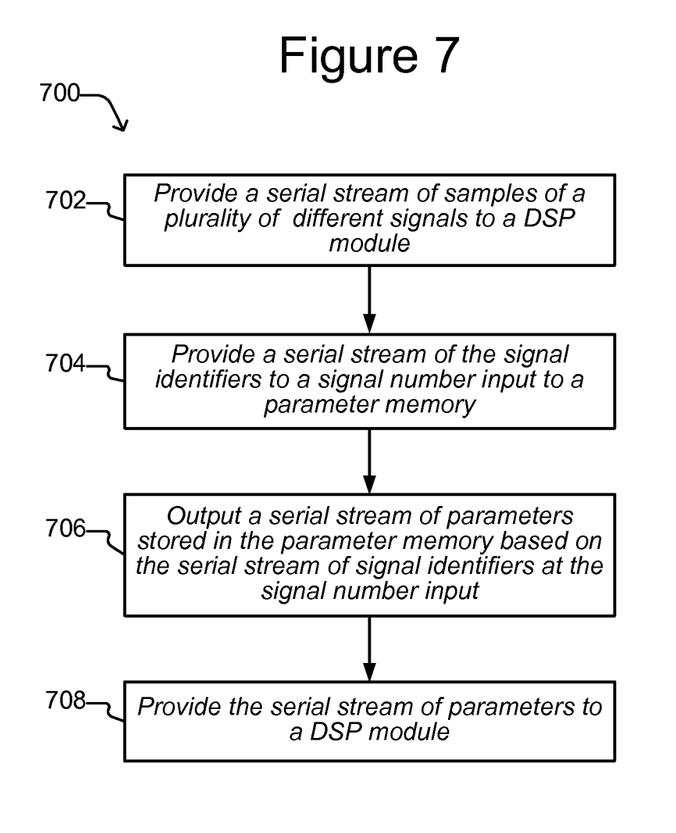
FIG. 7 is a flowchart of a process for performing a DSP algorithm on a serial stream of digital signal samples of a plurality of signals in accordance with some embodiments of the present invention.

Reference will now be made to FIG. 7, which illustrates a process 700 for performing a DSP algorithm on a serial stream of digital signal samples of a plurality of signals in accordance with some embodiments of the present invention. An example of the serial stream of digital signal samples 304 taken from signals $S_A$ 204, $S_B$ 206, and $S_C$ 208 is shown in FIG. 4 and described with reference to that FIGS. 3 and 4. As mentioned, this first serial stream of digital signal samples 304 from the plurality of "n" number of different signals can be provided by a mixing module (e.g., mixing module 302 of FIG. 3). The mixing module 302 can intake a plurality of "n" number of different signals and output a serial stream of digital signal samples 304 (shown in FIG. 4) of the plurality of "n" number of different signals.

In step 702, a serial stream of samples of a plurality of "n" number of different signals is provided to a DSP module. For example, as shown in the example DSP apparatus 300 of FIG. 3, the first serial stream of digital signal samples 304 can be provided from the mixing module 302 to the DSP module 202. FIG. 6 also shows a DSP module 600 that receives a first serial stream of digital signal samples 304 and performs a DSP algorithm (e.g., a FIR filter algorithm) on this serial stream of digital signal samples 304.

In step 704, a serial stream of signal identifiers is provided to a signal number input of a parameter memory. As mentioned, each signal identifier can identify a signal number corresponding to a sample. As mentioned, in some embodiments, each of the signal identifiers in the serial stream of signal identifiers can corresponding to one sample in the stream of digital signal samples. As shown in FIG. 3, a mixing module 302 can provide this first serial stream of signal identifiers 212 to a signal number input 104 (shown in FIG. 1) of the parameter memory 100. In some embodiments, as shown in FIG. 1, the signal identifier can directly identify a memory cell 102 of the parameter memory 100 in which a parameter is stored that corresponds to the sample. In other embodiments, as shown in FIG. 5, the signal identifier is used in a lookup table of a set of memory cells 504 to identify a parameter stored in another set of memory cells 102.

In step 706, a serial stream of parameters stored in one or more memory cells of the parameter memory is output at the signal output. The one or more memory cells from which the parameters are output can be identified by the serial stream of signal identifiers received in step 704. For example, as shown in FIG. 4, a serial stream of identifiers 212 can cause the parameter memory to output a sample from a memory cell corresponding to the signal identifiers of the serial stream of identifiers 212. This output is shown as taking place during the next clock cycle. Thus, as shown, the first identifier is a "0". During the next clock cycle, the parameter $P_0$ is output from the memory cell corresponding to the "0" signal identifier. This output is shown as the first sample in the serial stream of parameters 216.

In step 708, the serial stream of parameters is provided to the DSP module. As previously noted, the DSP module can utilize these parameters in one or more DSP algorithms that manipulate the digital signals to modify or improve those signals. The varied parameters in the serial stream of parameters can be input into the DSP algorithm at appropriate places and times to provide the necessary parameters to the DSP module as it processes the serial stream of samples of different signals. An example of a DSP module 600 that utilizes such parameters is shown and described with reference to FIG. 6.

From the foregoing, it will be seen that a DSP apparatus and process is provided for processing a plurality of different signals by providing a parameter memory configured to output a parameter to a DSP module based on the signal number of the signal being process by the DSP module.

Although specific embodiments and applications of the invention have been described in this specification, these embodiments and applications are exemplary only, and many variations are possible.

We claim:

1. A digital signal processing (DSP) apparatus for processing a plurality of different signals, said apparatus comprising:
   a DSP module configured to perform a DSP algorithm on said plurality of signals; and
   a parameter memory comprising a plurality of memory cells each having sufficient storage to store a parameter corresponding to at least one of said plurality of signals, wherein said parameter memory further comprises a signal number input and a parameter output, said parameter output being connected to said, and wherein said parameter memory is configured to output to said parameter output a parameter corresponding to a signal identifier at said signal number input, wherein the parameter memory is a physical digital memory device, wherein each said memory cell of said parameter memory corresponds to one of said plurality of signals.

2. The apparatus of claim 1, wherein said DSP module is further configured to perform a DSP algorithm on a serial stream of digital signal samples of said plurality of signals.

3. The apparatus of claim 1, wherein said DSP apparatus is a time-shared demodulator.

4. The apparatus of claim 1, wherein said parameter memory includes one or more random access memory (RAM) devices.

5. The apparatus of claim 1, wherein the DSP module includes at least one digital arithmetic module connected to said parameter output of said parameter memory.

6. The apparatus of claim 1 further comprising a digital signal processor comprising said DSP module.

7. A digital signal processing (DSP) apparatus for processing a plurality of different signals, said apparatus comprising:
   a DSP module configured to perform a DSP algorithm on said plurality of signals; and
   a parameter memory comprising a plurality of memory cells each having sufficient storage to store a parameter corresponding to at least one of said plurality of signals, wherein said parameter memory further comprises a signal number input and a parameter output, said parameter output being connected to said DSP module, and wherein said parameter memory is configured to output to said parameter output a parameter corresponding to a signal identifier at said signal number input,
   wherein the parameter memory is a physical digital memory device,
   wherein said plurality of memory cells is a first plurality of memory cells, wherein said parameter memory comprises a second plurality of memory cells each having sufficient storage to store an address of a memory cell of the first plurality of memory cells, and wherein said parameter memory is further configured to:
   output an address of a memory cell of the first plurality of memory cells from a memory cell of the second plurality of memory cells corresponding to said signal identifier at said signal number input, and
   output to said parameter output a parameter in said memory cell of said first plurality of memory cells corresponding to said address.

8. The apparatus of claim 7, wherein the number of memory cells in said first plurality of memory cells is less than a number of signals in said plurality of different signals.

9. A digital signal processing (DSP) apparatus for processing a plurality of different signals, said apparatus comprising:
   a DSP module configured to perform a DSP algorithm on said plurality of signals;
   a parameter memory comprising a plurality of memory cells each having sufficient storage to store a parameter corresponding to at least one of said plurality of signals, wherein said parameter memory further comprises a signal number input and a parameter output, said parameter output being connected to said DSP module, and wherein said parameter memory is configured to output to said parameter output a parameter corresponding to a signal identifier at said signal number input, wherein said DSP module is further configured to perform a DSP algorithm on a serial stream of digital signal samples of said plurality of signals; and
   a mixing module connected to said DSP module, said mixing module being configured to receive said plurality of different signals as separate signals and output said serial stream of digital signal samples to said signal number input of said parameter memory,
   wherein the parameter memory is a physical digital memory device.

10. The apparatus of claim 9, wherein said mixing module is further configured to output a serial stream of digital signal identifiers each said identifier corresponding to one of said samples in said stream of digital signal samples and identifying one of said signals to which said one of said samples corresponds.

11. A digital signal processing (DSP) apparatus for processing a plurality of different signals, said apparatus comprising:
   a DSP module configured to perform a DSP algorithm on said plurality of signals;
   a parameter memory comprising a plurality of memory cells each having sufficient storage to store a parameter corresponding to at least one of said plurality of signals, wherein said parameter memory further comprises a signal number input and a parameter output, said parameter output being connected to said DSP module, and wherein said parameter memory is configured to output to said parameter output a parameter corresponding to a signal identifier at said signal number input,
   wherein the parameter memory is a physical digital memory device,
   wherein said DSP module is further configured to perform a DSP algorithm on a serial stream of digital signal samples of said plurality of signals, and
   wherein said serial stream of digital signal samples comprises a serial stream of sample sets, each said sample set including an ordered series of single digital signal sample from each of said "n" number of different signals.

12. A process of performing a DSP algorithm on a serial stream of samples of a plurality of "n" number of different signals, said process comprising:
   providing a serial stream of samples of a plurality of "n" number of different signals to a DSP module;
   providing to a signal number input of a parameter memory a serial stream of signal identifiers each said signal identifier identifying one of said signals to which one of said samples corresponds;
   outputting to a signal output of said parameter memory a serial stream of parameters stored in one or more memory cells of said parameter memory identified by said serial stream of signal identifiers at said sample number input; and
   providing said serial stream of parameters to said DSP module,
   wherein the parameter memory is a physical digital memory device, and
   each said memory cell of said parameter memory corresponds to one of said plurality of signals.

13. The process of claim 12, wherein providing said serial stream of parameters to said DSP module comprises providing said serial stream of parameters to an arithmetic module of said DSP module.

14. The process of claim 12, further comprising receiving in a mixing module said plurality of "n" number of different signals and outputting from said mixing module said serial stream of digital signal samples.

15. The process of claim 12, wherein said DSP apparatus is a time-shared demodulator.

16. The process of claim 12, wherein said providing said serial stream comprises providing said serial stream of samples to a digital signal processor comprising said DSP module.

17. A process of performing a DSP algorithm on a serial stream of samples of a plurality of "n" number of different signals, said process comprising:
- providing a serial stream of samples of a plurality of "n" number of different signals to a DSP module;
- providing to a signal number input of a parameter memory a serial stream of signal identifiers each said signal identifier identifying one of said signals to which one of said samples corresponds;
- outputting to a signal output of said parameter memory a serial stream of parameters stored in one or more memory cells of said parameter memory identified by said serial stream of signal identifiers at said sample number input;
- providing said serial stream of parameters to said DSP module;
- receiving in a mixing module said plurality of "n" number of different signals and outputting from said mixing module said serial stream of digital signal samples; and
- outputting from said mixing module said first serial stream of signal identifiers,
- wherein the parameter memory is a physical digital memory device.

18. A process of performing a DSP algorithm on a serial stream of samples of a plurality of "n" number of different signals, said process comprising:
- providing a serial stream of samples of a plurality of "n" number of different signals to a DSP module;
- providing to a signal number input of a parameter memory a serial stream of signal identifiers each said signal identifier identifying one of said signals to which one of said samples corresponds;
- outputting to a signal output of said parameter memory a serial stream of parameters stored in one or more memory cells of said parameter memory identified by said serial stream of signal identifiers at said sample number input;
- providing said serial stream of parameters to said DSP module; and
- prior to providing said serial stream of sample, storing a parameter in said memory cells of said parameter memory corresponding to each of said plurality of "n" number of different signals,
- wherein the parameter memory is a physical digital memory device.

19. A process of performing a DSP algorithm on a serial stream of samples of a plurality of "n" number of different signals, said process comprising:
- providing a serial stream of samples of a plurality of "n" number of different signals to a DSP module;
- providing to a signal number input of a parameter memory a serial stream of signal identifiers each said signal identifier identifying one of said signals to which one of said samples corresponds;
- outputting to a signal output of said parameter memory a serial stream of parameters stored in one or more memory cells of said parameter memory identified by said serial stream of signal identifiers at said sample number input;
- providing said serial stream of parameters to said DSP module;
- outputting a serial stream of addresses of a memory cell of a first plurality of memory cells from memory cells of a second plurality of memory cells corresponding to said signal identifiers at said signal number input; and
- outputting to said parameter output said serial stream of parameters from memory cells of said first plurality memory cells corresponding to said serial stream of addresses,
- wherein the parameter memory is a physical digital memory device.

20. A process of performing a DSP algorithm on a serial stream of samples of a plurality of "n" number of different signals, said process comprising:
- providing a serial stream of samples of a plurality of "n" number of different signals to a DSP module;
- providing to a signal number input of a parameter memory a serial stream of signal identifiers each said signal identifier identifying one of said signals to which one of said samples corresponds;
- outputting to a signal output of said parameter memory a serial stream of parameters stored in one or more memory cells of said parameter memory identified by said serial stream of signal identifiers at said sample number input;
- providing said serial stream of parameters to said DSP module,
- wherein said serial stream of digital signal samples comprises a serial stream of sample sets, each said sample set including an ordered series of single digital signal sample from each of said "n" number of different signals,
- wherein the parameter memory is a physical digital memory device.

\* \* \* \* \*